(12) United States Patent
Thomas

(10) Patent No.: US 9,177,271 B2
(45) Date of Patent: Nov. 3, 2015

(54) HETEROGENEOUS INFORMATION TECHNOLOGY (IT) INFRASTRUCTURE MANAGEMENT ORCHESTRATION

(75) Inventor: Jeffery D. Thomas, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1698 days.

(21) Appl. No.: 12/191,838

(22) Filed: Aug. 14, 2008

(65) Prior Publication Data
US 2010/0042449 A1 Feb. 18, 2010

(51) Int. Cl.
| G06F 15/173 | (2006.01) |
| G06Q 10/06 | (2012.01) |
| H04L 12/24 | (2006.01) |
| G06Q 40/00 | (2012.01) |

(52) U.S. Cl.
CPC .............. G06Q 10/06 (2013.01); G06Q 40/00 (2013.01); H04L 41/5006 (2013.01); H04L 41/50 (2013.01); H04L 41/5003 (2013.01)

(58) Field of Classification Search
CPC ........................ H04L 41/5006; H04L 41/5003
USPC ......................................................... 709/220
See application file for complete search history.

(56) References Cited

U.S. PATENT DOCUMENTS

| 8,032,557 B1* | 10/2011 | Vijendra et al. ............... 707/783 |
| 2004/0153533 A1 | 8/2004 | Lewis ........................... 709/223 |
| 2006/0010195 A1* | 1/2006 | Mamou et al. ................ 709/203 |
| 2006/0085683 A1* | 4/2006 | Green et al. .................... 714/33 |
| 2007/0288419 A1* | 12/2007 | Strassner ........................ 706/55 |
| 2009/0307171 A1* | 12/2009 | Reeves ............................ 706/47 |
| 2012/0311157 A1* | 12/2012 | Erickson et al. .............. 709/226 |
| 2014/0040343 A1* | 2/2014 | Nickolov et al. ............. 709/201 |

OTHER PUBLICATIONS

Thomas, J. Darrel, "CMDB Standardization Alternatives—Wherefore DCML?" (34 pgs.), Date Unknown printed Jul. 29, 2008.
Thomas, J. Darrel, "DCML: Use Cases in IT Service Management" (27 pgs.), Date Unknown printed Jul. 29, 2008.
Thomas, J. Darrel, "DCML: The Missing Link in IT Service Management" (15 pgs.), Date Unknown printed Jul. 29, 2008.
Data Center Markup Language Framework Specification, *Draft* Version 0.13, (57 pgs.), Nov. 27, 2004.

(Continued)

*Primary Examiner* — Tom Y Chang
(74) *Attorney, Agent, or Firm* — Michael A. Dryja

(57) ABSTRACT

In certain embodiments, a method includes accessing one or more parameters based on an IT service request received from an upper-layer IT interface, the parameters formatted according to an upper-layer IT interface construct. Appropriate IT domains are determined, according to at least a portion of the parameters, from a number of IT domains for implementing IT infrastructure for fulfilling the request, the domains each associated with one or more vendor-specific solutions for providing IT infrastructure of a type associated with the domain. Using a common semantic interrelational data model that includes mappings of constructs for upper-layer IT interfaces to constructs for IT domains, at least a portion of the parameters are translated from the upper-layer IT interface construct into constructs suitable for use by the determined appropriate domains. One or more parameterized instructions operable to cause appropriate vendor-specific implementations of the determined appropriate domains to implement appropriate infrastructure for fulfilling the request are communicated.

17 Claims, 3 Drawing Sheets

(56) References Cited

OTHER PUBLICATIONS

DCML Framework Use Cases (8 pgs.), Date Unknown printed Jul. 29, 2008.
DCML Structural Map, Date Unknown printed Jul. 29, 2008.
www.dcml.org, selected pages (6 pgs.), printed Aug. 20, 2008.
DCML Business White Paper, "Simplifying Data Center Complexity," obtained from www.dcml.org (12 pgs.), printed Aug. 15, 2008.
Tim Howes, Darrel Thomas, DCML Technical White Paper, "Gaining Control of Complexity," obtained from www.dcml.org (8 pgs.), printed Aug. 15, 2008.
DCML Framework Use Cases, obtained from www.dcml.org (6 pgs.), printed Aug. 15, 2008.
DCML Fact Sheet: data center markup language, obtained from www.dcml.org, printed Aug. 15, 2008 (2 pgs.), Oct. 2003.
Louis Blatt, Darrel Thomas, "DCML Organization Releases Draft 1.0 Framework Specification," obtained from www.dcml.org (15 pgs.), printed Aug. 15, 2008.
Marc Andreessen, DCML Introduction: "Setting the Standard for Utility Computing," obtained from www.dcml.org, printed Aug. 15, 2008 (23 pgs.), Oct. 14, 2003.
Jeff Kelly, Larry Lozon, Customer Drivers for DCML: "Setting the Standard for Utility Computing," obtained from www.dcml.org, printed Aug. 15, 2008 (7 pgs.), Oct. 14, 2003.
Tim Howes, Darrel Thomas, DCML Technical Overview: "Setting the Standard for Utility Computing," obtained from www.dcml.org, printed Aug. 15, 2008 (20 pgs.), Oct. 14, 2003.
DCML Positioning Overview: Where DCML fits in, obtained from www.dcml.org (2 pgs.), printed Aug. 15, 2008.

\* cited by examiner

HETEROGENEOUS INFORMATION TECHNOLOGY (IT) INFRASTRUCTURE MANAGEMENT ORCHESTRATION

TECHNICAL FIELD

The present invention relates generally to computer systems, and more particularly to heterogeneous IT infrastructure management orchestration.

BACKGROUND

Client entities often contract with an IT service provider or other entity for the IT service provider to provide one or more IT services to the client. These IT services may include management of IT infrastructure for the client, including interaction with one or more IT infrastructure domains. In IT environments, particularly for IT service providers, many IT infrastructure domain management solutions have disparate techniques in which they communicate programmatic interfaces and provide data or metadata to upper-layer IT service management interfaces. As enterprises and IT service providers acquire and use infrastructure domain management tools in their respective environments, vendor-specific implementations of application program interfaces (APIs), scripting interfaces, adapter data constructs, and supporting data schemas may lead to large amounts of manual integration and/or rip-and-replace activities when vendors change existing functionality or add new functionality. Additionally, simply processing requests for IT services may involve substantial amounts of human interaction.

SUMMARY

According to certain embodiments of the present invention, disadvantages and problems associated with previous techniques for managing IT infrastructure may be reduced or eliminated.

In certain embodiments, a method includes accessing one or more parameters based on an IT service request received from an upper-layer IT interface, the parameters formatted according to an upper-layer IT interface construct. Appropriate IT domains are determined, according to at least a portion of the parameters, from a number of IT domains for implementing IT infrastructure for fulfilling the request, the domains each associated with one or more vendor-specific solutions for providing IT infrastructure of a type associated with the domain. Using a common semantic interrelational data model that includes mappings of constructs for upper-layer IT interfaces to constructs for IT domains, at least a portion of the parameters are translated from the upper-layer IT interface construct into constructs suitable for use by the determined appropriate domains. One or more parameterized instructions operable to cause appropriate vendor-specific implementations of the determined appropriate domains to implement appropriate infrastructure for fulfilling the request are communicated.

Particular embodiments of the present invention may provide one or more technical advantages. In certain embodiments, the present invention enables electronic IT infrastructure management within and across one or more heterogeneous IT domains (e.g., storage, server, network, IT applications, and IT virtualization management) without being encumbered by the associated vendor specificity. The present invention may provide continuous bi-directional communication between upper-level IT interfaces (e.g., enterprise systems management (ESM)) and an orchestration engine, whereby operational-level IT events may cause new infrastructure actions in order to respond to these events. In certain embodiments, the orchestration engine reduces or eliminates human intervention in responding to IT events, substantially automating IT infrastructure management. This may facilitate providing IT infrastructure management as a service.

In certain embodiments, orchestration may apply to Infrastructure-as-a-Service, Service-Oriented Infrastructure, Web Hosting, Enterprise Managed Service Offering packages, and Enterprise Cloud Computing Offering packages, possibly ensuring that a multi-tenant, multi-vendor technology approach can be integrated into various enterprise management approaches offered by an IT service provider. Embodiments of the present invention may reduce or eliminate variability in costing the price to manage technologies from region to region or location to location in an enterprise of global reach.

IT infrastructure management orchestration may be a leveled, open/non-proprietary, and heterogeneous approach for IT infrastructure management. Disparate vendors in the infrastructure management space may offer similar tools in a domain with differing data and coding schemes. Embodiments of the present invention may use programmatic methods and integration frameworking to alleviate direct dependence on vendor-specific domain management solutions, while accommodating future vendor changes within their particular product enhancements and varying management, programming, and data/metadata approaches. An IT service provider may be able to directly integrate vendor IT infrastructure management specificity using integration abstraction to provide just-in-time binding to a single construct for upward IT service integration. Embodiments of the present invention may provide coalescence, de-duplication, and semantic modeling to obtain a unique management and orchestrative view for the IT service provider to integrate service-oriented infrastructure management across the vendor-specific tools, either within or across domains.

As the IT services industry moves to a completely electronically managed infrastructure environment, embodiments may help ensure that no single domain can disrupt a properly designed and iteratively maintained IT services management model, particularly in the IT divisional management construct. The present invention may reduce or eliminate operational disruption caused by updated or new domain management product releases. For example, embodiments may allow new tools and technologies, including new adapters and functions if appropriate, to be introduced into the environment with minimal concern for migration, disruption, integration, and CAPEX/OPEX costs associated with the rework.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DESCRIPTION OF EXAMPLE EMBODIMENTS

Figure 1:
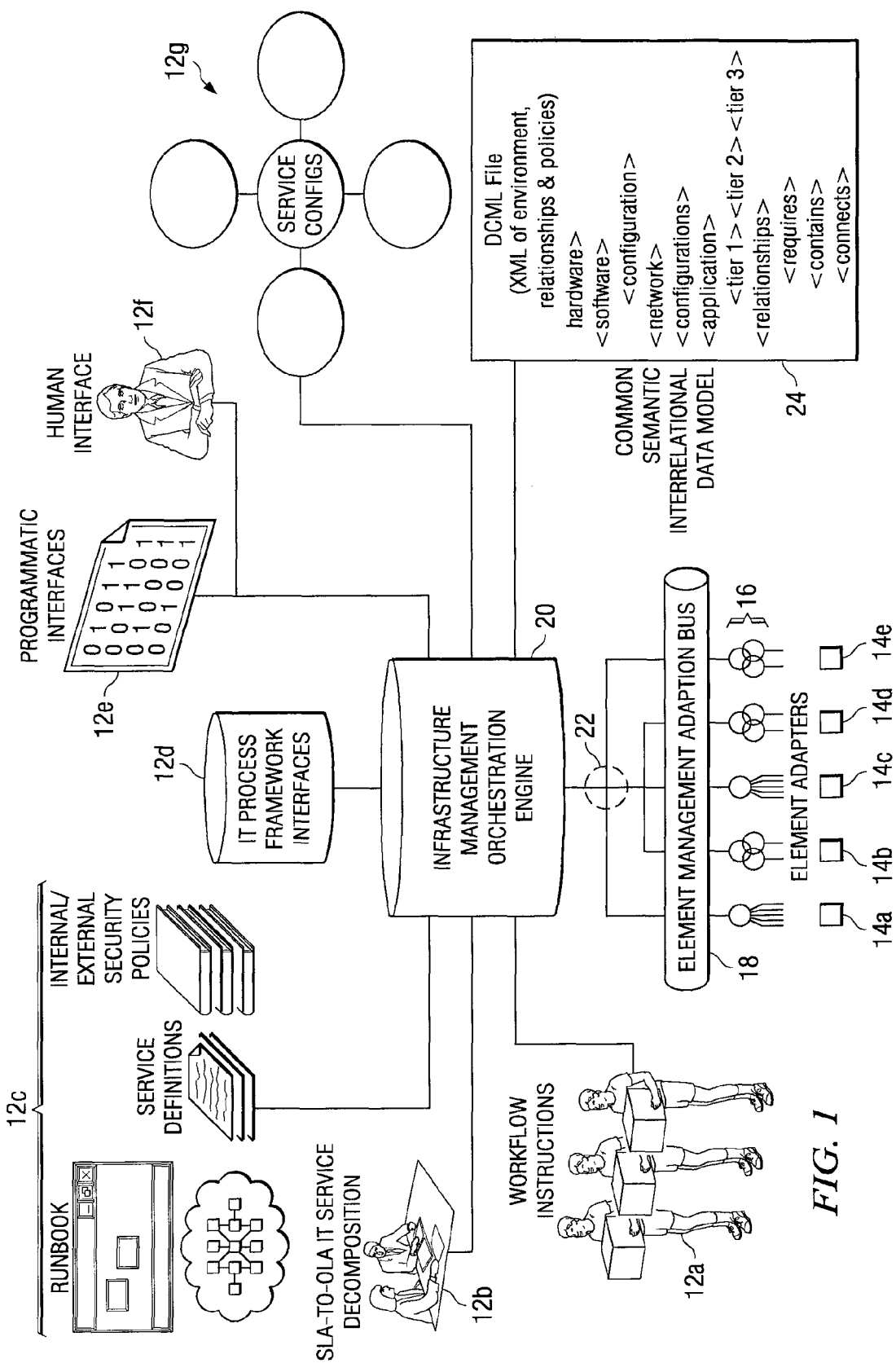
FIG. 1 illustrates an example system for heterogeneous IT infrastructure management orchestration, according to certain embodiments of the present invention.

FIG. 1 illustrates an example system 10 for heterogeneous IT infrastructure management orchestration, according to certain embodiments of the present invention. In the illustrated example, system 10 includes one or more upper-layer interfaces 12, one or more IT infrastructure domains 14, one or more element adapters 16, an element management adaptation bus 18, and an orchestration engine 20. Although this particular implementation of system 10 is illustrated and primarily described, the present invention contemplates any suitable implementation of system 10 according to particular needs.

In general, system 10 provides substantially automated heterogeneous management of IT infrastructure. Embodiments of the present invention may provide for managing IT infrastructure as a service in a global, heterogeneous way. As described in more detail below, orchestration engine 20 may serve as an intermediary between upper-layer interfaces 12 and domains 14, processing IT infrastructure request and response flows.

As used throughout this description, the terms "client" or "clients" may include any suitable entities that contract with an external contractor (e.g., an IT service provider) to provide various IT services including IT infrastructure management to the client. Clients may be internal or external clients of the IT service provider. According to embodiments of the present invention, clients may contract with an IT service provider for the service provider to provide IT infrastructure as a service to the clients. It should be understood that although system 10 is described primarily as being provided by one or more IT service providers to one or more clients, the present invention contemplates a portion or all of system 10 being implemented entirely within a single enterprise.

Clients may submit requests for IT services to system 10 (either electronically or through a human interface such as an employee of the IT service provider). The IT service requests contemplated by the present invention generally relate to IT infrastructure. The IT service requests may be event-driven IT infrastructure service requests provided by one or more upper-layer interfaces 12. Each IT service request may be associated with a corresponding client (e.g., of an IT service provider). As examples, the request may be an entirely new IT infrastructure configuration for the client or a modification to an existing IT infrastructure configuration for the client. Particular example IT service request may relate to capacity management, security management, or change management. For example, a client may request that the capacity for its website be increased to handle 50,000 additional hits per day. Although particular IT services are described herein, the present invention contemplates any suitable type of IT service according to particular needs.

The request may include one or more parameters, such as a unique ID of the client and any other suitable parameters. These additional parameters may be associated with the new or modified configuration, for example. Clients of an IT service provider, or any other suitable user, may submit IT service requests via one or more upper-layer interfaces 12, described in more detail below. The request may be formatted according to a construct used by upper-layer IT interfaces 12. For example, at least a portion of the one or more parameters of the request, as well as any other suitable portions of the request, may be formatted according to the upper-layer IT interface 12 construct via which the request was received.

System 10 includes one or more IT infrastructure domains 14. Each infrastructure domain 14 may provide a particular type of IT infrastructure. The IT infrastructure provided by each domain 14 may be used to fulfill IT service requests received from upper-layer interfaces 12. In general, domains 14 represent different IT areas to be managed. Example infrastructure domains 14 may include Server, Storage, Network, IT Applications, IT Virtualization, and any other suitable infrastructure domains. In certain embodiments, each domain 14 is associated with a distinct type of IT infrastructure. Each type of domain 14 may be associated with its own interfaces and data constructs for managing the domain 14. Thus, domains 14 may be considered heterogeneous from one another. Certain embodiments of the present invention seek to manage domains 14 and interactions with domains 14.

Within each domain 14, multiple, heterogeneous vendor solutions may exist for managing or otherwise providing the functions of the domain 14. For example, the vendor solutions may assist in establishing or otherwise configuring the IT infrastructure associated with a domain 14 according to an IT services request. Each vendor-specific solution for a particular domain 14 may provide programmatic and data processing interfaces that vary from other vendor-specific solutions for the particular domain 14. As a first example, a server domain 14 may include management of MICROSOFT WINDOWS servers, UNIX servers, and any other suitable servers. As a second example, a network domain 14 may include management of both CISCO and non-CISCO devices. As a third example, a storage domain 14 may include management of both EMC and non-EMC storage devices. In other words, one or more of domains 14 may each include multiple, heterogeneous vendor solutions to be managed. Additionally or alternatively, new vendor product releases and innovations may modify the programmatic interfaces and data flows of vendor-specific solutions as new functionality is introduced from domain 14 to domain 14.

Taking a server domain 14 as an example, multiple vendors may offer solutions for managing the server domain 14. Each vendor solution may describe server management in different ways. For example, each vendor solution may have different descriptions, different interfaces (e.g., APIs), different outputs, and different methods to communicate with the solution. However, these multiple vendors likely provide a substantially similar set of functionality and data elements for server management. As will be described in more detail below, these similarities may be leveraged to abstract from the vendor-specific solutions to provide a substantially uniform way of interacting with a domain 14.

System 10 includes one or more element adapters 16 and an adaptation bus 18, which may be referred to collectively as an adaptation layer. Element adapters 16 may be instantiated from domain 14 to domain 14. In certain embodiments, each element adapter 18 provides an abstract interface to the multiple, heterogeneous vendor-specific solutions for a corresponding domain 14. For example, each adapter 16 may abstract particular interfaces, functions, and parameters for the vendor-specific solutions for a corresponding domain 14 to a common representation that can be used to communicate and interact with those vendor-specific solutions.

Element adapters 16 may comprise one or more of the following: an API, XML interface, a common language interface (e.g., a command line interface), or any other suitable component for communicating with vendor-specific solutions for managing domains 14. At build time, a team (e.g., associated with the IP service provider) may analyze the different vendor-specific solutions for a domain 14, determine a common set of functionality (or other needed functionality) and format for data representation across the different solutions, and configure or otherwise build the adapters 16 to communicate with the vendor-specific techniques for performing those functions.

In certain embodiments, a single adapter 16 abstracts from the various vendor-specific solutions within the domain 14 associated with the adapter 16. In such case, the adapters 16 may present a unified view of the underlying vendor-specific solutions for managing the domain 14 using the element management adaptation bus 18. Additionally or alternatively, each vendor-specific solution within each domain 14 may have a corresponding adapter 16 that facilitates communication with the vendor-specific solution.

System 10 may include an element management adaptation bus 18, which may be operable to provide an abstract interface across domains 14. For example, adaptation bus 18 may provide disparate vendor programmatic and data semantic correlation, mediation, and ontological synchronization of code and data/metadata from domain 14 to domain 14. In certain embodiments, adaptation bus 18 comprises Enterprise Application Integration (EAI) bus topology. For the purposes of a directed set of data and code from enterprise or IT service provider domains 14, it may be appropriate to support one or more of an Enterprise Service Bus, Event-Driven Architecture, and a combination of loose and tight coupling. For example, supporting one or more of the above may be appropriate because domains 14 may or may not implement Service-Oriented Architectural (SOA) concepts. As particular examples, adaptation bus 18 may include a TIBCO bus, a SYMBIAN bus, or any other suitable type of adaptation bus 18.

System 10 includes one or more upper-layer interfaces 12. Upper-layer interfaces 12 may provide event-driven IT service requests to orchestration engine 20 in a typical IT services management environment, either on behalf of a single enterprise or an IT service provider multi-tenant enterprise. In certain embodiments, upper-layer interfaces 12 are application-level interfaces (e.g., APIs or web service requests, or some other suitable electronic abstraction).

Upper-layer interfaces 12 may include workflow instructions 12a, service-level agreement (SLA)-to-Operational-level agreement (OLA) IT service decomposition 12b, service-level management resources 12c, IT process framework interfaces 12d, programmatic interfaces 12e, human interfaces 12f, configuration management databases 12g, and any other suitable upper-level interfaces. The example upper-level interfaces 12 illustrated in FIG. 1 are described in more detail below. Although particular upper-layer interfaces 12 are illustrated and primarily described, the present invention contemplates system 10 including any suitable number and types of upper-layer IT interfaces 12 in any suitable combination.

Workflow instructions 12a provide workflow management. For example, workflow instructions 12a may specify in what order requests for IT services should be performed. As a particular example, if it is determined that fulfilling an IT service request involves a server domain 14 and a network domain 14, workflow instructions 12a may specify that appropriate operations associated with network domain 14 should be performed before appropriate operations associated with storage domain 14 are performed. In other words, workflow instructions 12a specify the order in which appropriate operations associated with appropriate domains 14 should be performed. In certain embodiments, workflow instructions 12a may be provided using a digital workflow or internal workflow engine.

SLA-to-OLA IT service decomposition 12b may provide the description of service delivery automation, enterprise service management, or IT service management. In certain embodiments, SLA-to-OLA IT service decomposition 12b may comprise system display architecture (SDA) service level management.

Service-level management resources 12c may include any suitable combination of a Runbook, service descriptors, and/or security policies (e.g., internal and/or external security policies). Resources 12c may be a part of service level management and may be available to SLA-to-OLA IT service decomposition 12b. Runbook may include a breakdown of the infrastructure executable instructions that orchestrator 20 may receive to then cause domains 14 to execute work (i.e., implement appropriate infrastructure for fulfilling the IT service request). In certain embodiments, Runbook includes one or more infrastructure commands. A service description may include an application-level service description. For example, a particular client may specify that its website should be built in a three-tier architecture, with the first tier being a presentation layer, the second tier being a business logic tier using application servers, and the third tier comprising database servers. The application-level service description for this client may also specify the types of servers, databases, and other components that are acceptable in application-level terminology, which may allow for decomposition of actual IT infrastructure mapping by Enterprise Service Management and for recomposition of Runbook Infrastructure by orchestration engine 20 for operational efficiency and elimination of static hardware/software lock-in. The security policy may specify either or both of the internal and external security policy requested by the client.

IT process framework interfaces 12d may provide an interface for managing IT infrastructure and applications in order to optimize service delivery to clients. IT process framework interfaces 12d may be implemented in any suitable manner, according to particular needs. As just one example, IT process framework interfaces 12d may be implemented using the SDA/ESM interface. In certain embodiments, IT process framework interfaces 12d is the primary interface through which some or all of the other upper-layer interfaces 12 access IT services. IT process framework interfaces 12d may be the idle functions that comprise the IT service level of an IT service provider. As just a few examples, these idle functions may include incident management, problem management, change management, capacity management, and service level management (e.g., SLAs, security policies, etc.).

System 10 may include one or more programmatic interfaces 12e and/or one or more human interfaces 12f. It may be appropriate to provide at least one programmatic interface 12e and at least one human interface 12f because there may be some instances in which a client requests human interaction and some instances in which the client indicates that no human interaction is appropriate. For example, if the service provider already has a good understanding of how the client's application works and the IT service request is fairly straightforward (e.g., adding capacity to an existing infrastructure), human interaction between the client and the service provider may not be necessary.

Where human interaction is appropriate, the human (e.g., a business consulting architect or a consulting systems engineer of the service provider) may provide a business or technology lead to the client so that the client can understand, among other things, the functionality of its application, its supporting IT infrastructure, and any changes that may be introduced by the IT service request. As an example, if a client is releasing a new version of its website, the client may prefer to speak to a consultant about the client's objectives and potential application designs for achieving those objectives. The consultant may then input appropriate information to orchestration engine 20 through human interface 12f (e.g., a GUI or web interface) or the consultant could allow IT process framework interfaces 12d (e.g., ESM) to input this application functionality at the layer of the process framework and handle the request purely electronically.

System 10 may include one or more configuration management databases 12g. Databases 12g may store service configurations for clients of system 10. Service configurations may be predefined descriptions of the client's IT infrastructure, service definitions and policies, and any other suitable information. IT process framework interfaces 12d and databases 12g may be considered a federation of the ways that domains 14 store configurations for the purposes of being executed when some parameter is communicated to domains 14 (e.g., like a capacity management parameter).

The service configurations for a particular client may be specified and stored in database 12g at a configuration and registration phase (i.e., at build time, prior to system 10 processing requests from the client). The service configurations for the particular client may be updated in database 12g over time. For example, the service configurations for the particular client may be updated in response to an IT infrastructure service request being processed by system 10, if appropriate. Each client may be assigned a unique ID. The service configuration that corresponds to a client may be indexed by and accessed using the unique ID for the client. For example, IT infrastructure service requests received by system 10 may include the unique ID of the client associated with the request, which may be used to access the service configuration for that client in database 12g.

The service configuration for a particular client may be used to configure the processing of the IT infrastructure service request from the particular client to provide the requested IT infrastructure service according to the specifications for the particular client. A service configuration for a particular client may specify one or more processes for performing a requested IT infrastructure service for the client, as well as provide details regarding the client's existing IT infrastructure. The service configurations may include any other suitable information, according to particular needs. A particular advantage of certain embodiments of the present invention is the ability to allow IT infrastructure services to be provided according to client-specific configurations for each of a number of clients.

Additionally or alternatively, service configurations may be more general in that they provide ways to implement particular infrastructure independent of the client. For example, in server management it may be appropriate to know how to provision a MICROSOFT WINDOWS from HEWLETT-PACKARD, a MICROSOFT WINDOWS server from SUN, and a MICROSOFT WINDOWS server from DELL. Those service configurations can be lower-level domain configurations that are stored in databases 12g that instruct server domain 14 how to automatically or electronically configure a server appropriately.

Domains 14 (e.g., vendor-specific solutions within domains 14, via the adaptation layer if appropriate) may reference databases 12g when implementing appropriate infrastructure for fulfilling IT service requests. Domains 14 may store their corresponding information in databases 12g in element-entity form, in a composite form, or in any other suitable manner. As a particular example, databases 12g may store service configuration for Company A's website (CompanyA.com), and that service configuration information may indicate what the website looks like from a service standpoint. The service configuration information may identify or otherwise reference existing IT infrastructure components for the website. This service configuration information, which may be accessed by orchestration engine 20, may provide a view of the service configuration for a client across multiple domains 14.

Databases 12g may each take the form of volatile or non-volatile memory including, without limitation, magnetic media, optical media, random access memory (RAM), read-only memory (ROM), removable media, or any other suitable memory component. In a particular example, databases 22 comprise relational databases. Although described as configuration management databases, databases 12g may be any suitable type of databases or other memory modules. Databases 12g may be separate from or integral to, in whole or in part, one or more other components of system 10, according to particular needs. Databases 12g may be a federation of databases.

System 10 includes IT infrastructure management orchestration engine 20. Orchestration engine 20 may serve as the center of the interrelational execution and data aggregation for system 10. Among other things, interrelational execution may refer to the ability of orchestration engine 20 to determine the one or more appropriate domains 14 for implementing appropriate infrastructure for fulfilling IT service requests. Data aggregation may include the transformation of data from a construct associated with upper-layer IT interfaces 12 to a construct associated with domains 14 (as presented by the adaptation layer), and from a construct associated with domains 14 (as presented by the adaptation layer) to a construct associated with upper-layer interfaces 12. Orchestration engine 20 may communicate with upper-layer interfaces 12 in a common format and with domains 14 (via the adaptation layer) in a distinct common format.

Orchestration engine 20 may serve as an intermediary between upper-layer interfaces 12 and domains 14, processing IT infrastructure request and response flows. For example, using the now properly unified interrelational information, orchestration engine 20 may properly instruct downstream requests (e.g., IT service requests received from upper-layer interfaces 12 to domains 14) and coordinates upstream responses (e.g., from domains 14 to upper-layer IT interfaces 12) bi-directionally.

In certain embodiments, orchestration engine 20 may comprises one or more interfaces that allow orchestration engine 20 to be functional for the heterogeneous environments. For example, these components may include a meta-map (e.g., common semantic interrelational data model 24, described below) and the process to integrate the functions from IT process framework interfaces 12d.

In certain embodiments, the IT service provider is responsible for building and/or maintaining orchestration engine 20. Orchestration engine 20 may be located at a site operated by the IT service provider, and may be available for use to a number of clients. For example, the present invention contemplates orchestration engine 20 supporting multi-tenancy (e.g., a single deployment instance of one or more orchestration engines 20 being capable of supporting multiple clients). Alternatively, an instance of orchestration engine 20 may be installed at a site associated with a particular client.

Although a single orchestration engine 20 is illustrated and primarily described, the present invention contemplates system 10 including any suitable number of orchestration engines 20 according to particular needs. As an example, an IT service provider may deploy a number of orchestration engines 20, each associated with a corresponding geographical region and serving the IT infrastructure requests of clients within the corresponding region. In this example, the multiple orchestration engines 20 may operate as a mesh network of orchestration engines 20.

System 10 may include a common semantic interrelational data model 24, which may be used by orchestration engine 20 to process requests for IT services. Data model 24 may be stored in any suitable location, according to particular needs. In certain embodiments, data model 24 is a part of orchestration engine 20.

Data model 24 may map constructs for upper-layer IT interfaces 12 to constructs for domains 14. For example, the mappings of constructs for upper-layer IT interfaces 12 to constructs for domains 14 may include semantic associations of like sets of metadata for upper-layer interfaces 12 and domains 14, semantic associations of possible IT service requests from upper-layer interfaces 12 and responses from domains 14, and any other suitable mappings. Data model 24 is an example of the way in which orchestration engine 20 can process these relationships, internal to orchestration engine 20 across heterogeneous domains 14. In other words, data model 24 allows orchestration engine 20 to represent output from domains 14 upstream to upper-layer interfaces 12 in a common way.

Data model 24 may be a metadata mapping model that semantically associates like sets of data and metadata and requests and responses from domains 14 into a singularly understandable set of data/metadata to use in communicating with upper-layer interfaces 12. This mapping may be implemented in a propriety manner and/or using a standards-based protocol/method. As a particular example of a standards-based implementation, data model 24 may be implemented using the Datacenter Markup Language (DCML). For example, data model 24 stored as one or more DCML files.

System 10 may include an orchestrative interface 22 operable to provide interrelational execution of the now singularly visible code and data constructs across the infrastructure domains 14, either for the purposes of inter-domain execution or single domain execution, depending on the IT service request received via upper-layer interfaces 12. Orchestrative interface 22 may be internal to or external from orchestration engine 20.

The components of system 10 may be implemented using any suitable combination of software, firmware, and hardware. System 10 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Each computer system of system 10 may include one or more processing modules and one or more memory modules. A processing module may include one or more microprocessors, controllers, or any other suitable computing devices or resources. Processing modules may work, either alone or with other components of system 10, to provide the functionality of system 10 described herein. Each memory module may take the form of volatile or non-volatile memory including, without limitation, magnetic media, optical media, random access memory (RAM), read-only memory (ROM), removable media, or any other suitable memory component.

System 10 may include one or more networks (for simplicity, referred to hereinafter in the singular). The network facilitates wireless or wireline communication. The network may communicate, for example, IP packets, Frame Relay frames, Asynchronous Transfer Mode (ATM) cells, voice, video, data, and other suitable information between network addresses. Network may include one or more local area networks (LANs), radio access networks (RANs), metropolitan area networks (MANs), wide area networks (WANs), all or a portion of the global computer network known as the Internet, and/or any other communication system or systems at one or more locations.

In operation of an example embodiment of system 10, orchestration engine 20 may receive an IT service request. As described above, the IT service request may be an event-driven IT infrastructure service request provided by one or more upper-layer interfaces 12. IT service request may be associated with a corresponding client (e.g., of an IT service provider). As examples, the request may be an entirely new IT infrastructure configuration for the client or a modification to an existing IT infrastructure configuration for the client. A particular example IT service request may be a capacity management request.

The request may include one or more parameters, such as a unique ID of the client and any other suitable parameters. These additional parameters may be associated with the new or modified configuration, for example. The request may be submitted according to a construct used by upper-layer IT interfaces 12.

In response to receiving the IT service request, orchestration engine 20 may access one or more parameters based on the request. For example, at least a portion of the one or more parameters may be included in the IT service request, and orchestration engine 20 may access those parameters of the request. Additionally or alternatively, orchestration engine 20 may access one or more other upper-layer interfaces 12 based on information included in the request to determine at least a portion of the one or more parameters. For example, in response to receiving the request, orchestration engine 20 may use a client ID specified in the request to access service configurations for the client that are stored in database 12g.

The one or more parameters may include configuration data associated with the IT service request. For example, the one or more parameters may include current configuration information associated with the current IT infrastructure of the client associated with the request. Additionally or alternatively, the configuration information may include desired configuration information associated with desired functionality/infrastructure according the IT service request.

The one or more parameters may be formatted according to an upper-layer IT interface construct. For example, the data and metadata of the one or more parameters may be in a format suitable for upper-layer IT interfaces 12, but not be formatted in such a way that they are useable by domains 14.

Orchestration engine 20 may determine, according to at least a portion of the one or more parameters, one or more appropriate IT domains 14 from the plurality of IT domains 14 for implementing IT infrastructure to fulfilling the IT service request. In certain embodiments, orchestration engine 20 determines the one or more appropriate IT domains 14 using data model 24. For example, data model 24 may include mappings of particular IT service requests to particular domains 14 for providing appropriate IT infrastructure to fulfill those requests. At least a portion of the parameters accessed by orchestration engine 20 may provide additional information for determining which vendor-specific solutions within each domain 14 are appropriate for providing the IT infrastructure for fulfilling the request.

Returning to an example described above, the IT service request may be a request to add capacity to a client's website (e.g., the ability to handle 50,000 additional hits per day). The one or more parameters determined by orchestration engine 20 may include the client ID, the current configuration of the client's website, the desired increase in capacity, and any other suitable information. Based on this information, and using data model 24 if appropriate, orchestration engine 20 may be able to determine the one or more appropriate domains for fulfilling the request.

Orchestration engine 20 may translate, using data model 24, at least a portion of the one or more parameters from the upper-layer IT interface construct into constructs suitable for use by the determined one or more appropriate IT domains 14. As described above, data model 24 may include mappings of constructs for a plurality of upper-layer IT interfaces 12 to constructs for a plurality of IT domains 14. The constructs for the plurality of domains 14 may be suitable for communication use by adaptation bus 18. Although described as translating the one or more parameters from the upper-layer IT interface construct into constructs suitable for use by the determined one or more appropriate IT domains 14, it should be understood that the one or more parameters may be translated into the common format provided by the adaptation layer (i.e., one or more of adapters 16 and adaptation bus 18).

Orchestration engine 20 may communicate one or more parameterized instructions operable to cause appropriate vendor-specific implementations of the determined one or more appropriate domains 14 to implement appropriate infrastructure for fulfilling the IT service request. In certain embodiments, the information included in the one or more parameterized instructions is sufficient to inform adaptation bus 18 of the appropriate vendor-specific implementations of the determined one or more domains 14 and any data that may be appropriate for use by the appropriate vendor-specific implementations of the determined one or more appropriate domains 14 to implement appropriate infrastructure for fulfilling the IT service request. Element adapters 16 may handle communication with the appropriate vendor-specific implementations.

The appropriate vendor-specific implementations in each determined domain 14 may perform the work to implement the appropriate infrastructure for fulfilling the request, and may generate one or more outputs. The outputs from each domain 14 may be communicated individually, as a package, or in any other suitable manner. The adaptation layer may transform the outputs into an abstracted, common representation across all of the appropriate domains 14, which may be in the form of construct for use by domains 14. The adaptation layer may communicate the common representation to orchestration engine 20. If appropriate, the outputs may be stored in database 18.

Orchestration engine 20 may receive the outputs in the common representation communicated by adaptation bus 18. Orchestration engine 20 may translate, using data map 24, the output from the construct suitable for use by domains 14 to a construct suitable for use by upper-layer interfaces 12. Orchestration engine 20 may communicate the output to an appropriate upper-layer interface 12 formatted according to the construct suitable for use by the appropriate upper-layer interface 12.

Particular embodiments of the present invention may provide one or more technical advantages. In certain embodiments, the present invention enables electronic IT infrastructure management within and across one or more heterogeneous IT domains 14 (e.g., storage, server, network, IT applications, and IT virtualization management) without being encumbered by the associated vendor specificity. The present invention may provide continuous bi-directional communication between upper-level IT interfaces 12 (e.g., enterprise systems management (ESM)) and orchestration engine 20, whereby operational-level IT events may cause new infrastructure actions in order to respond to these events. In certain embodiments, orchestration engine 20 reduces or eliminates human intervention in responding to IT events, substantially automating IT infrastructure management. This may facilitate providing IT infrastructure management as a service.

In certain embodiments, orchestration may apply to Infrastructure-as-a-Service, Service-Oriented Infrastructure, Web Hosting, and Enterprise Managed Service Offering packages, possibly ensuring that a multi-tenant, multi-vendor technology approach can be integrated into various enterprise management approaches offered by an IT service provider. Embodiments of the present invention may reduce or eliminate variability in costing the price to manage technologies from region to region or location to location in an enterprise of global reach.

IT infrastructure management orchestration may be a leveled, open/non-proprietary, and heterogeneous approach for IT infrastructure management. Disparate vendors in the infrastructure management space may offer similar tools in a domain 14 with differing data and coding schemes. Embodiments of the present invention may use programmatic methods and integration frameworking to alleviate direct dependence on vendor-specific domain management solutions, while accommodating future vendor changes within their particular product enhancements and varying management, programming, and data/metadata approaches. An IT service provider may be able to directly integrate vendor IT infrastructure management specificity using integration abstraction to provide just-in-time binding to a single construct for upward IT service integration. Embodiments of the present invention may provide coalescence, de-duplication, and semantic modeling to obtain a unique management and orchestrative view for the IT service provider to integrate service-oriented infrastructure management across the vendor-specific tools, either within or across domains 14.

As the IT services industry moves to a completely electronically managed infrastructure environment, embodiments may help ensure that no single domain 14 can disrupt a properly designed and iteratively maintained IT services management model, particularly in the IT divisional management construct. The present invention may reduce or eliminate operational disruption caused by updated or new domain management product releases. For example, embodiments may allow new tools and technologies, including new adapters 16 and functions if appropriate, to be introduced into the environment with minimal concern for migration, disruption, integration, and CAPEX/OPEX costs associated with the rework.

Figure 2:
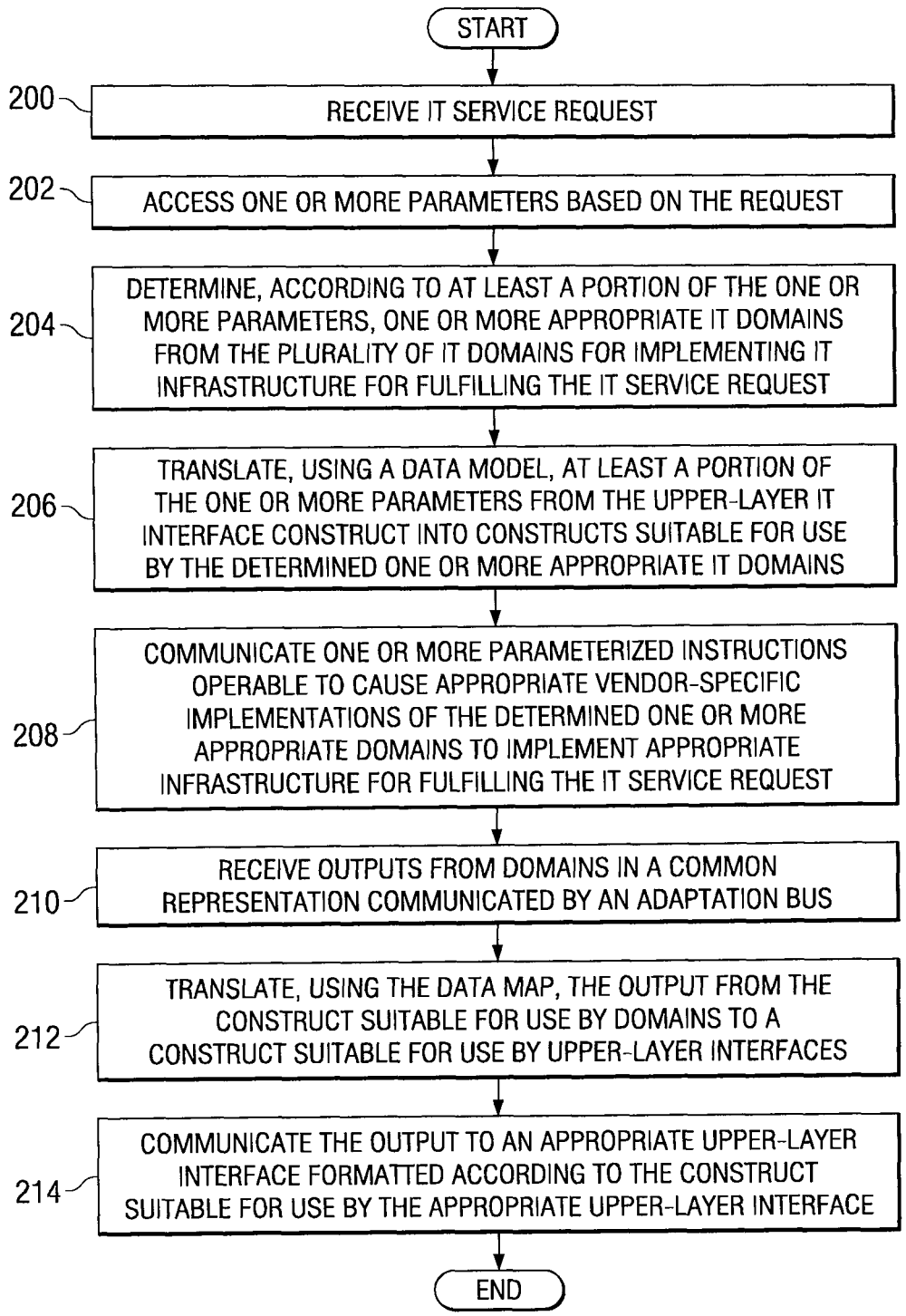
FIG. 2 illustrates an example method for heterogeneous IT infrastructure management orchestration, according to certain embodiments of the present invention.

FIG. 2 illustrates an example method for heterogeneous IT infrastructure management orchestration, according to certain embodiments of the present invention. The method may be implemented in any suitable combination of software, firmware, and hardware, according to particular needs. Although particular components may be identified as performing particular steps, the present invention contemplates any suitable components performing the steps according to particular needs.

At step 200, orchestration engine 20 may receive an IT service request. As described above, the IT service request may be an event-driven IT infrastructure service request provided by one or more upper-layer interfaces 12. IT service request may be associated with a corresponding client (e.g., of an IT service provider). As examples, the request may be an entirely new IT infrastructure configuration for the client or a modification to an existing IT infrastructure configuration for the client. A particular example IT service request may be a capacity management request.

The request may include one or more parameters, such as a unique ID of the client and any other suitable parameters. These additional parameters may be associated with the new or modified configuration, for example. The request may be submitted according to a construct used by upper-layer IT interfaces 12.

At step 202, in response to receiving the IT service request, orchestration engine 20 may access one or more parameters based on the request. For example, at least a portion of the one or more parameters may be included in the IT service request, and orchestration engine 20 may access those parameters of the request. Additionally or alternatively, orchestration engine 20 may access one or more other upper-layer interfaces 12 based on information included in the request to determine at least a portion of the one or more parameters. For example, in response to receiving the request, orchestration engine 20 may use a client ID specified in the request to access service configurations for the client that are stored in database 12g.

The one or more parameters may include configuration data associated with the IT service request. For example, the one or more parameters may include current configuration information associated with the current IT infrastructure of the client associated with the request. Additionally or alternatively, the configuration information may include desired configuration information associated with desired functionality/infrastructure according the IT service request.

The one or more parameters may be formatted according to an upper-layer IT interface construct. For example, the data and metadata of the one or more parameters may be in a format suitable for upper-layer IT interfaces 12, but not be formatted in such a way that they are useable by domains 14.

At step 204, orchestration engine 20 may determine, according to at least a portion of the one or more parameters, one or more appropriate IT domains 14 from the plurality of IT domains 14 for implementing IT infrastructure to fulfilling the IT service request. In certain embodiments, orchestration engine 20 determines the one or more appropriate IT domains 14 using data model 24. For example, data model 24 may include mappings of particular IT service requests to particular domains 14 for providing appropriate IT infrastructure to fulfill those requests. At least a portion of the parameters accessed by orchestration engine 20 may provide additional information for determining which vendor-specific solutions within each domain 14 are appropriate for providing the IT infrastructure for fulfilling the request.

Returning to an example described above, the IT service request may be a request to add capacity to a client's website (e.g., the ability to handle 50,000 additional hits per day). The one or more parameters determined by orchestration engine 20 may include the client ID, the current configuration of the client's website, the desired increase in capacity, and any other suitable information. Based on this information, and using data model 24 if appropriate, orchestration engine 20 may be able to determine the one or more appropriate domains for fulfilling the request.

At step 206, orchestration engine 20 may translate, using data model 24, at least a portion of the one or more parameters from the upper-layer IT interface construct into constructs suitable for use by the determined one or more appropriate IT domains 14. As described above, data model 24 may include mappings of constructs for a plurality of upper-layer IT interfaces 12 to constructs for a plurality of IT domains 14. The constructs for the plurality of domains 14 may be suitable for communication use by adaptation bus 18. Although described as translating the one or more parameters from the upper-layer IT interface construct into constructs suitable for use by the determined one or more appropriate IT domains 14, it should be understood that the one or more parameters may be translated into the common format provided by the adaptation layer (i.e., one or more of adapters 16 and adaptation bus 18).

At step 208, orchestration engine 20 may communicate one or more parameterized instructions operable to cause appropriate vendor-specific implementations of the determined one or more appropriate domains 14 to implement appropriate infrastructure for fulfilling the IT service request. In certain embodiments, the information included in the one or more parameterized instructions is sufficient to inform adaptation bus 18 of the appropriate vendor-specific implementations of the determined one or more domains 14 and any data that may be appropriate for use by the appropriate vendor-specific implementations of the determined one or more appropriate domains 14 to implement appropriate infrastructure for fulfilling the IT service request. Element adapters 16 may handle communication with the appropriate vendor-specific implementations.

The appropriate vendor-specific implementations in each determined domain 14 may perform the work to implement the appropriate infrastructure for fulfilling the request, and may generate one or more outputs. The outputs from each domain 14 may be communicated individually, as a package, or in any other suitable manner. The adaptation layer may transform the outputs into an abstracted, common representation across all of the appropriate domains 14, which may be in the form of construct for use by domains 14. The adaptation layer may communicate the common representation to orchestration engine 20. If appropriate, the outputs may be stored in database 18.

At step 210, orchestration engine 20 may receive the outputs in the common representation communicated by adaptation bus 18. At step 212, orchestration engine 20 may translate, using data map 24, the output from the construct suitable for use by domains 14 to a construct suitable for use by upper-layer interfaces 12. At step 214, orchestration engine 20 may communicate the output to an appropriate upper-layer interface 12 formatted according to the construct suitable for use by the appropriate upper-layer interface 12.

Although a particular method for heterogeneous IT infrastructure management orchestration has been described with reference to FIG. 2, the present invention contemplates any suitable method in accordance with the present invention. Thus, certain of the steps described with reference to FIG. 2 may take place substantially simultaneously and/or in different orders than as shown and described. Moreover, components of system 10 may use methods with additional steps, fewer steps, and/or different steps, so long as the methods remain appropriate. Furthermore, although particular components of system 10 are described as performing particular steps of the method described with reference to FIG. 2, the present invention contemplates any suitable components of system 10 and/or components of other embodiments of the present invention performing the steps.

Figure 3:
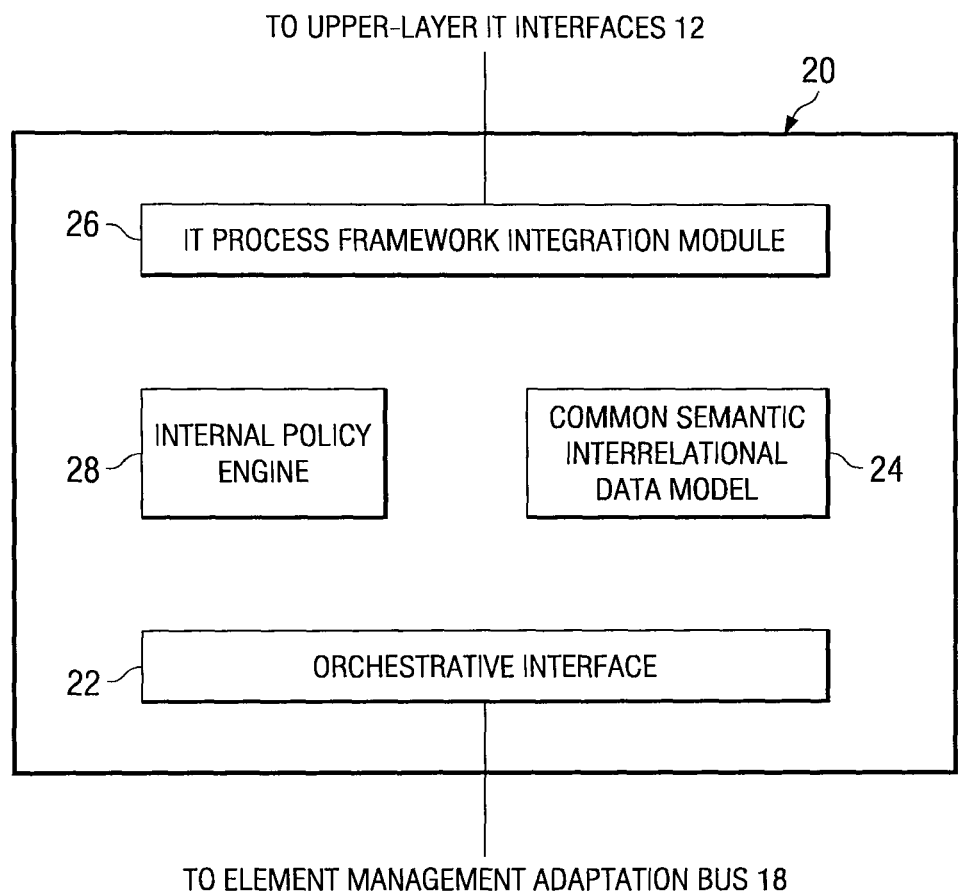
FIG. 3 illustrates an example orchestration engine in greater detail.

FIG. 3 illustrates an example orchestration engine 20 in greater detail. In the illustrated example, orchestration engine 20 includes orchestrative interface 22, data model 24, IT process framework integration module 26, and internal policy engine 28. Each of these components of orchestration engine 20 is described in greater detail below. Although orchestration engine 20 is described as including particular components and those components are described as performing particular functions, the present invention contemplates orchestration engine 20 comprising any suitable components, each operable to perform any of the functions of orchestration engine 20. Additionally, although various components of orchestration engine 20 are illustrated and described separately, the present invention contemplates combining these components (or further separating these components), if appropriate.

IT process framework integration module 26 may include interfaces written into orchestration engine 20 for communicating with upper-layer IT interfaces 12. For example, integration module 26 may be operable to communicate with upper-layer IT interfaces 12 according to the constructs of upper-layer IT interfaces 12.

As described above, orchestrative interfaces 22 may be operable to provide interrelational execution of the singularly visible code and data constructs across the infrastructure domains 14, either for the purposes of inter-domain execution or single domain execution, depending on the IT service request received via upper-layer interfaces 12.

As described above, data model 24 may be used by orchestration engine 20 to process requests for IT services. Data model 24 may be stored in any suitable location, according to particular needs. In certain embodiments, data model 24 is a part of orchestration engine 20.

Data model 24 may map constructs for upper-layer IT interfaces 12 to constructs for domains 14. For example, the mappings of constructs for upper-layer IT interfaces 12 to constructs for domains 14 may include semantic associations of like sets of metadata for upper-layer interfaces 12 and domains 14, semantic associations of possible IT service requests from upper-layer interfaces 12 and responses from domains 14, and any other suitable mappings. Data model 24 is an example of the way in which orchestration engine 20 can process these relationships, internal to orchestration engine 20 across heterogeneous domains 14. In other words, data model 24 allows orchestration engine 20 to represent output from domains 14 upstream to upper-layer interfaces 12 in a common way.

Data model 24 may be a metadata mapping model that semantically associates like sets of data and metadata and requests and responses from domains 14 into a singularly understandable set of data/metadata to use in communicating with upper-layer interfaces 12. This mapping may be implemented in a propriety manner and/or using a standards-based protocol/method. As a particular example of a standards-based implementation, data model 24 may be implemented using Datacenter Markup Language (DCML). For example, data model 24 stored as one or more DCML files.

Internal policy engine 28 may drive the translation mechanism and any other suitable functions of orchestration engine 20. For example, framework integration module 26 receive an IT service request from an upper-layer IT interface 12, the request being formatted according to the construct of the upper-layer IT interface 12. In response to the request, internal policy engine 20 may be operable to access one or more parameters based on the request, the one or more parameters formatted according to the upper-layer IT interface construct. Internal policy engine may determine, according to at least a portion of the one or more parameters, one or more appropriate IT domains 14 for implementing IT infrastructure for fulfilling the IT service request. Internal policy engine 20 may translate, using data model 24, at least a portion of the one or more parameters from the construct of the upper-layer IT interface 12 into constructs suitable for use by the determined one or more appropriate domains 14. Internal policy engine 28 may also construct the one or more parameterized instructions for communication, using orchestrative interfaces 22, to the adaptation layer (e.g., to adaptation bus 18) to cause appropriate vendor-specific implementations of the determined one or more appropriate domains to implement appropriate infrastructure for fulfilling the IT service request.

Orchestration engine 20 may be implemented in any suitable combination of software, firmware, and hardware. Orchestration engine 20 may include or otherwise by executed by one or more processing units. Additionally, orchestration engine may include or otherwise have access to one or more memory units.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system that facilitates management of Information Technology (IT), comprising:
   a non-transitory storage medium storing computer-executable code;
   a processor to execute the computer-executable code;
   an orchestration engine implemented by the processor executing the computer-executable code from the non-transitory storage medium, the orchestration engine to translate parameters from an upper layer interface of a heterogeneous IT infrastructure to constructs of a domain associated with a vendor specific solution and vice versa, wherein the domain fulfills a request for a modification of existing services currently being provided by the heterogeneous IT infrastructure, the non-transitory storage medium storing mappings of the constructs from the upper-layer interface to the domain; and
   a selection and implementation mechanism implemented by the processor executing the computer-executable code from the non-transitory storage medium to at least:
      determine the vendor specific solution from among a plurality of vendors that supply the existing services; and
      implement the vendor specific solution for integration with the heterogeneous IT infrastructure, to achieve the modification,
   wherein the upper layer interface comprises:
      a service-level agreement (SLA)-to-operational level agreement (OLA) IT service decomposition interface to decompose a description of one or more of service delivery automation, enterprise service management, and IT service management to an OLA IT service; and
      a service-level management resources interface to describe one or more of a Runbook, a service descriptor, and a security policy, the service-level management resources interface available to the SLA-to-OLA IT service decomposition interface, the SLA-to-OLA IT service decomposition interface using the service-level management resources interface to decompose the description to the OLA IT service.

2. The system of claim 1 further comprising a common semantic interrelational data model that facilitates the mappings of constructs, the common semantic interrelational data model includes at least one of
- semantic associations of like sets of metadata for upper-layer interfaces and domains; or
- semantic associations of IT service requests from the upper-layer interfaces and responses from the domains.

3. The system of claim 2, wherein the common semantic interrelational data model is implementable by a standards-based implementation.

4. The system of claim 1 further comprising an adaptation layer that communicates with a plurality of domains for vendor specific solutions according to a common form.

5. The system of claim 4 further comprising:
- an element adapter associated with the domain to form an abstract interface, for the vendor specific solutions.

6. The system claim 5 further comprising an element management adaptation bus that provides the abstract interface across a plurality of domains.

7. The system of claim 6, further comprising processing units that: receive a response generated by the domain, the response being abstracted by the adaptation layer;
- translate, at least a portion of the response into a construct for an appropriate upper-layer interface; and
- communicate the response to the appropriate upper-layer interface.

8. The system of claim 1 further comprising:
- an interface operable to receive input from an end user; and
- a programmatic interface operable to receive input from an application.

9. The system of claim 1, wherein the domain includes at least one of:
- a server management domain; or
- a network management domain; or
- a storage management domain; or
- an IT applications management domain; or
- an IT virtualization management domain.

10. A method of managing Information Technology (IT) systems, comprising:
- receiving a request for modification of existing services that are currently being provided by an IT infrastructure, the request received from an upper-layer IT interface;
- accessing a parameter based on the request the parameter formatted according to an upper-layer IT interface construct of a heterogeneous IT infrastructure, including:
  - accessing a request parameter provided in the request; and
  - accessing the upper-layer IT interface to determine at least a portion of the parameter based on the request parameter provided in the request;
- determining by a system including a processor, an IT domain for a vendor specific solution of the heterogeneous IT infrastructure, based in-part on the parameter, from among a plurality of vendors that supply the existing service;
- translating the parameter from the upper layer IT interface to obtain a construct associated with the IT domain, the translating act employs a common semantic interrelational data model;
- receiving a response generated by vendor-specific implementations of the IT domain;
- abstracting the response so that the response is no longer vendor-specific;
- translating the response as has been abstracted via an interelational data model;
- processing relationships among the heterogeneous IT infrastructure via an orchestration engine, using the response as has been translated; and
- implementing modifications in the IT infrastructure to fulfill the request wherein the upper-layer IT interface comprises:
  - a service-level agreement (SLA)-to-operational level agreement (OLA) IT service decomposition interface to decompose a service description to an OLA IT service; and
  - a service-level management resources interface to describe at least a Runbook, the SLA-to-OLA IT service decomposition interface using the service-level management resources interface to decompose the service description to the OLA IT service.

11. The method of claim 10 further comprising:
- employing semantic associations of like sets of metadata for the upper-layer interface and the domain and
- providing semantic associations of possible IT service requests from upper-layer interfaces and responses from the domain.

12. The method of claim 10 further comprising implementing the common semantic interrelational data model via a standards-based implementation.

13. The method of claim 10 further comprising communicating with a plurality of domains for vendor specific solutions according to a common form.

14. The method of claim 10 further comprising supplying an abstract interface for vendor specific solutions.

15. The method claim 14 further comprising providing the abstract interface across a plurality of domains.

16. The method of claim 10 further comprising representing the IT domain by at least one of: a server management domain; or a network management domain; or a storage management domain; or an IT applications management domain; or an IT virtualization management domain.

17. The system of claim 1, wherein the vendor specific solution is determined as that being provided by a selected vendor among the plurality of vendors that is best able to fulfill the request.

* * * * *